United States Patent
Ramphal et al.

(10) Patent No.: US 12,157,080 B2
(45) Date of Patent: Dec. 3, 2024

(54) AIR FILTER APPARATUS, SYSTEM AND METHOD

(71) Applicant: CLEANAIR.AI CORPORATION, Brampton (CA)

(72) Inventors: Chet Ramphal, Brampton (CA); Devin Ramphal, Brampton (CA); Michael Petgrave, Brampton (CA); Parth Patel, Toronto (CA); Jimmy Nguyen, Hamilton (CA)

(73) Assignee: BLADE FILTERS INC., North York (CA)

( * ) Notice: Subject to any disclaimer, the term of this patent is extended or adjusted under 35 U.S.C. 154(b) by 731 days.

(21) Appl. No.: 17/252,768

(22) PCT Filed: Jun. 25, 2019

(86) PCT No.: PCT/CA2019/050877
§ 371 (c)(1),
(2) Date: Dec. 16, 2020

(87) PCT Pub. No.: WO2020/000089
PCT Pub. Date: Jan. 2, 2020

(65) Prior Publication Data
US 2021/0252443 A1    Aug. 19, 2021

Related U.S. Application Data
(60) Provisional application No. 62/689,354, filed on Jun. 25, 2018.

(51) Int. Cl.
*B01D 46/00* (2022.01)
*B01D 46/10* (2006.01)
(Continued)

(52) U.S. Cl.
CPC ......... *B01D 46/0086* (2013.01); *B01D 46/00* (2013.01); *B01D 46/0002* (2013.01);
(Continued)

(58) Field of Classification Search
CPC ................ B01D 46/00; B01D 46/0002; B01D 46/0084; B01D 46/009
See application file for complete search history.

(56) References Cited

U.S. PATENT DOCUMENTS

| 3,027,865 A | 1/1959 | Kautz et al. |
| 4,183,029 A | 1/1980 | Isayama et al. |

(Continued)

FOREIGN PATENT DOCUMENTS

| CN | 204944997 U | * | 1/2016 |
| CN | 105642038 B | * | 12/2017 |

(Continued)

OTHER PUBLICATIONS

International Preliminary Report on Patentability dated Jan. 7, 2021 in respect of PCT/CA2019/050877.
(Continued)

*Primary Examiner* — Robert A Hopkins
(74) *Attorney, Agent, or Firm* — Smart & Biggar LP

(57) ABSTRACT

An air filter apparatus includes at least one frame that is configured to receive a filter media, and at least one sensing mechanism for sensing contamination of the filter media. The sensing mechanism can include a wave emitter and a wave detector. The wave emitter and the wave detector can be arranged so that the wave travels along a path that is substantially parallel to outer faces of the filter media. The wave detector can be located at a first edge of the frame, and the wave emitter can be located spaced apart laterally from the wave detector at a second edge of the frame, so that waves from the emitter can travel along the path through and (Continued)

laterally across the filter media towards the detector. The path can be substantially perpendicular to the general direction of air flow within the filter media.

19 Claims, 17 Drawing Sheets

(51) Int. Cl.
*B01D 46/24* (2006.01)
*B01D 46/42* (2006.01)
*B01D 46/44* (2006.01)
*F24F 11/39* (2018.01)

(52) U.S. Cl.
CPC ..... *B01D 46/0005* (2013.01); *B01D 46/0084* (2013.01); *B01D 46/009* (2013.01); *B01D 46/10* (2013.01); *B01D 46/24* (2013.01); *B01D 46/4245* (2013.01); *B01D 46/429* (2013.01); *B01D 46/442* (2013.01); *F24F 11/39* (2018.01); *B01D 46/0032* (2013.01); *B01D 46/0036* (2013.01)

(56) References Cited

U.S. PATENT DOCUMENTS

| | | |
|---|---|---|
| 4,400,971 A | 8/1983 | Tassicker |
| 4,828,586 A | 5/1989 | Joannou |
| 5,497,099 A | 3/1996 | Walton |
| 5,796,472 A | 8/1998 | Wirthlin |
| 7,178,410 B2 | 2/2007 | Fraden et al. |
| 8,231,716 B2 | 7/2012 | Poon |
| 8,744,780 B2 | 6/2014 | Wilson, Jr. et al. |
| D725,254 S | 3/2015 | Roblin |
| 9,061,229 B1 | 6/2015 | Wilson, Jr. et al. |
| 9,101,871 B2 | 8/2015 | Salahshour et al. |
| 9,304,521 B2 | 4/2016 | Kates |
| 9,517,429 B2 | 12/2016 | Beier |
| 9,552,715 B2 | 1/2017 | Breslin |
| 9,920,947 B2 | 3/2018 | Breslin |
| 10,509,377 B2 | 12/2019 | Willette et al. |
| 2009/0055987 A1* | 3/2009 | Becker .................. A61F 9/068 2/209.13 |
| 2012/0125592 A1 | 5/2012 | Fadell et al. |
| 2015/0052978 A1 | 2/2015 | Beier |
| 2016/0121251 A1* | 5/2016 | Baek ...................... F24F 8/108 96/417 |
| 2019/0391052 A1 | 12/2019 | Lavrovsky et al. |

FOREIGN PATENT DOCUMENTS

| | | | |
|---|---|---|---|
| CN | 107413124 A | * 12/2017 | |
| ES | 2659058 T3 | * 3/2018 | ............. B01D 46/00 |
| JP | 2006326544 A | * 12/2006 | |
| TW | 1740545 B | 9/2021 | |
| WO | 2020000089 A1 | 1/2020 | |

OTHER PUBLICATIONS

International Search Report dated Sep. 4, 2019 in respect of PCT/CA2019/050877.

* cited by examiner

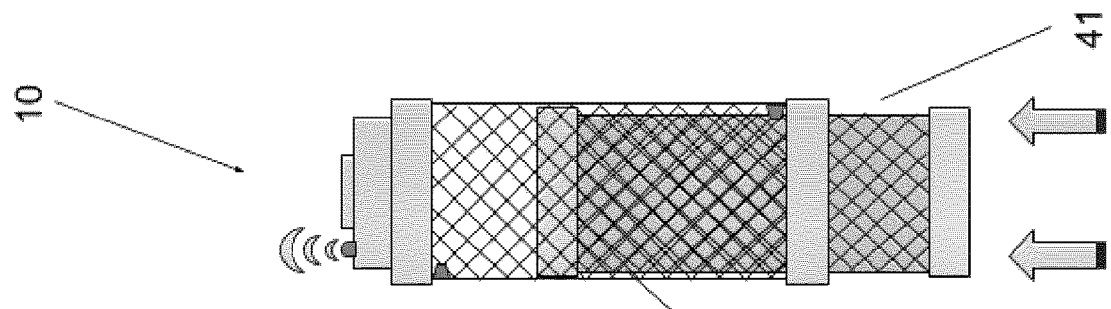
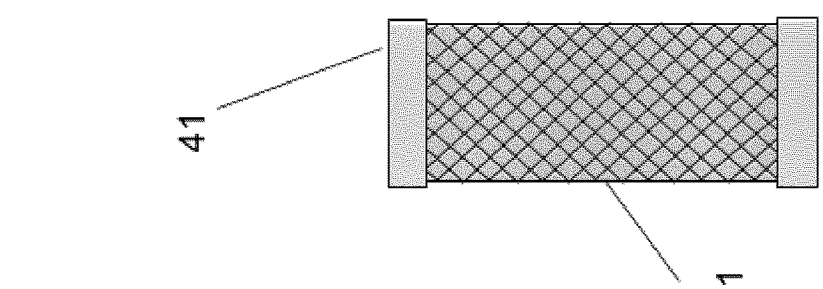
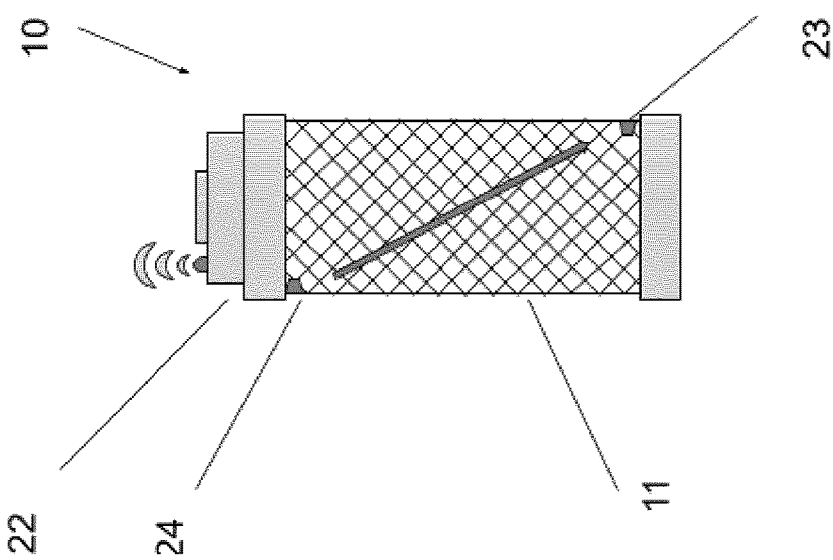

| 70 | 71 | 72 | 73 |
|---|---|---|---|
| Filter ID | Filter Location | Change Date | User ID |
| 000001 | Building A | 2018/04/01 | User123 |
| 000002 | Building A | 2018/04/01 | User123 |
| 000003 | Building A | 2018/04/01 | User123 |
| 000004 | Building B | 2018/02/01 | User234 |
| 000005 | Building B | 2018/02/01 | User234 |

Fig. 14

AIR FILTER APPARATUS, SYSTEM AND METHOD

CROSS REFERENCE TO RELATED APPLICATIONS

This is a national stage application of International Application No. PCT/CA2019/050877 filed on Jun. 25, 2019, which claims priority to U.S. Provisional Application No. 62/689,354 filed on Jun. 25, 2018, and the entire contents of each is hereby incorporated herein by reference.

FIELD

The present disclosure relates generally to air filters that include a mechanism for estimating and/or determining the degree of contamination.

BACKGROUND

The following paragraphs are not an admission that anything discussed in them is prior art or part of the knowledge of persons skilled in the art.

U.S. Pat. No. 4,828,586 describes an electronic air filter of the charged media type in which the filter media and screens form a disposable cartridge. The high voltage power supply, which is made long and slender, attaches to the side of the cartridge and it is powered by a low voltage power supply.

U.S. Pat. No. 9,061,229 describes a clogged filter detector having a transmitter and a sensor which are held in place by a transmitter bracket and a sensor bracket, respectively. The transmitter emits a beam of electromagnetic radiation, and the sensor is positioned in the path of this beam at a point such that the beam travels through a filter between the transmitter and the sensor. The transmitter and sensor are mis-aligned with the air flow at the point where the beam contacts the filter. The transmitter alternates between a transmitting mode and a dormant mode, and the transmitter emits a plurality of electromagnetic pulses during each transmitting mode.

U.S. Pat. No. 9,517,429 describes a filtration monitoring system. Filtration monitoring system may include a sensor configured to measure a characteristic of usage of a monitored filter. The sensor may be communicatively coupled to a controller which is configured to transfer measured data to a server of the filter monitoring system. Server may be configured to store historical data regarding representative filter usage and may determine a predicted expiration time for a monitored filter which may be adjusted based upon the measured data from the sensor.

U.S. Pat. No. 9,552,715 describes a filter condition indicator system. A pressure differential switch monitors air pressure across a filter, and a transmitter coupled to the pressure differential switch sends a signal to a networked device. If the pressure differential near the filter triggers the switch, then a "dirty" signal is sent to or retrieved by a mobile device which indicates that the filter is dirty and should be replaced. The filter condition indicator is able to be used by bypassing a thermostat and sending an alert to a computer or mobile device wirelessly. Alternatively, the filter condition indicator system described herein is able to be used in conjunction with a previously installed furnace/thermostat system by utilizing the pre-existing thermostat wiring. The filter condition indicator system is able to be used with HVAC systems, air conditioning systems, other heating/cooling systems, or other systems or devices.

INTRODUCTION

The following is intended to introduce the reader to the detailed description that follows and not to define or limit the claimed subject matter.

In an aspect of the present disclosure, an air filter apparatus can comprise: at least one frame that is configured to receive a filter media; and at least one sensing mechanism for sensing contamination of the filter media. The at least one sensing mechanism can comprise a wave emitter configured to emit a wave and a wave detector configured to detect the wave. The wave emitter can comprise at least one of an electromagnetic wave emitter and a sonic wave emitter.

The at least one frame can comprise a front frame and a back frame that is coupled to the front frame, and the front and back frames can be movable between open and closed positions, and, in use in the closed position, the filter media is arranged between the front and back frames. The at least one frame can comprise a plurality of frame edges, and at least one of the frame edges can be open to permit the filter media to be slidably inserted into the apparatus.

The wave emitter and the wave detector can be arranged so that the wave travels along a path that is substantially parallel to outer faces of the filter media. The wave detector can be located at a first edge of the at least one frame, and the wave emitter can be located spaced apart laterally from the wave detector at a second edge of the at least one frame, so that waves from the emitter travel along the path through and laterally across the filter media towards the detector. The path can be substantially perpendicular to the general direction of air flow within the filter media. The wave detector and the wave emitter can be located at respective upper corners of the at least one frame, so that waves from the emitter travel along a first path through the filter media at an angle downwardly and laterally, and scattered along the way to travel along a second path through the filter media at an angle upwardly and laterally towards the detector. The wave detector and the wave emitter can be located on adjacent sides of the at least one frame, so that waves from the emitter travel along a first path through and substantially diagonally across the filter media towards the detector. At least one of the wave detector and the wave emitter can be located on a conductive strip and the other can be spaced apart and located within the filter media, so that waves from the emitter travel along a first path through and across the filter media towards the detector. The wave detector and the wave emitter can be located at diagonally opposite corners of the at least one frame, so that waves from the emitter travel along the path through and substantially diagonally across the filter media. The wave detector and the wave emitter can be located at adjacent to a same corner of the at least one frame, so that waves from the emitter travel along the path through and substantially diagonally across the filter media.

The at least one frame can comprise a cylindrical frame. The cylindrical frame can be sized and shaped to receive the filter media slidably inserted into an open end thereof. The wave detector can be located adjacent to a first end of the frame and the wave emitter can be located spaced apart axially from the wave detector adjacent to a second end of the frame, so that waves from the emitter can travel through and axially across the filter media towards the detector. The wave detector and the wave emitter can be located at radially opposite sides of the frame, so that waves from the emitter travel through and axially and radially across the filter media towards the detector.

The apparatus can comprise a plurality of conductive elements that are configured to be positioned within the filter media to measure at least one electrical property of the filter media. The apparatus can comprise a compartment that houses at least one electrical component. The at least one electrical component can be selected from a transformer, a printed circuit board, a microprocessor, a controller, a memory module, an internal power supply, a communication module, a voltmeter, an ammeter, a capacitance measurement instrument, a resistance measurement instrument, and a wave generator. The apparatus can comprise at least one of an internal power source and an external power source.

The apparatus can comprise at least one sensor configured to detect contaminants in air flowing through the filter media. The contaminants can be selected from at least one of volatile organic compounds, carbon monoxide, radon gas, and particulates. The apparatus can comprise a strain gauge sensor configured to detect resistance of the filter media to air flow. The apparatus can comprise at least one of a filter ID marker and a QR code marker. The at least one sensing mechanism can comprise a weight sensor configured to measure a mass of the filter media over time.

The apparatus can be combined with the filter media. The filter media can comprise at least one of a HEPA filter, an activated carbon filter, a standard HVAC filter, an electrostatic filter media, and an active field polarized media.

In an aspect of the present disclosure, a system can comprise: an air filter apparatus for use with a filter media, the apparatus comprising a sensing mechanism for sensing contamination of the filter media and generating information, and a communication mechanism for sending the information via a network; and an Application Programming Interface (API) located on a remote server that is accessible via the network, wherein the API receives the information from the apparatus. The information can comprise at least one of: wave measurements received by a detector; electrical measurements received by electrical components; a filter identification code; a filter location; a filter status; a timestamp; environmental data; a user ID; and filter control codes.

The API can communicate with cloud services. The cloud services can comprise at least one of database services, artificial intelligence, machine learning, and data analytical services. Communication between the API and the cloud services can comprise at least one of: data exchanged between the apparatus and the API; type of particulate matter; soil level; fill level of the filter media; rate of particulate matter accumulation on the filter media; estimate of building air quality; and change history of the filter media.

The API can communicate with client services. The client services can comprise at least one of mobile applications, computer applications, web applications, and building automation systems. Communication between the API and the client services can comprise at least one of: data exchanged between the apparatus, the API and the cloud services; filter media ordering information; and user interface and presentation information.

The system can comprise a user interface connected via the network to provide information about the filter media. The API can be configured to deliver to the user interface at least on of filter status information, reset of filter information, filter identification, filter location, particulate matter characteristics, and indoor air quality In an aspect of the present disclosure, a method can comprise: coupling an air filter apparatus with a filter media; with the air filter apparatus, sensing contamination of the filter media to generate information; and communicating the information to a remote server. The information can comprise at least one of: wave measurements received by a detector; electrical measurements received by electrical components; a filter identification code; a filter location; a filter status; a timestamp; environmental data; a user ID; and filter control codes.

The method can comprise: receiving the information at the remote server; and communicating with cloud services, the cloud services comprising at least one of database services, artificial intelligence, machine learning, and data analytical services.

The method can comprise: receiving the information at the remote server; and communicating with client services, the client services comprising at least one of mobile applications, computer applications, web applications, and building automation systems.

The method can comprise providing information about the filter media to a user interface.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses, systems and methods of the present disclosure and are not intended to limit the scope of what is taught in any way. In the drawings:

FIGS. 9a, 9b and 9c are schematic views of a ninth example of an air filter apparatus.

FIG. 14 illustrates an example of a user interface on a client application.

DETAILED DESCRIPTION

Figure 1:
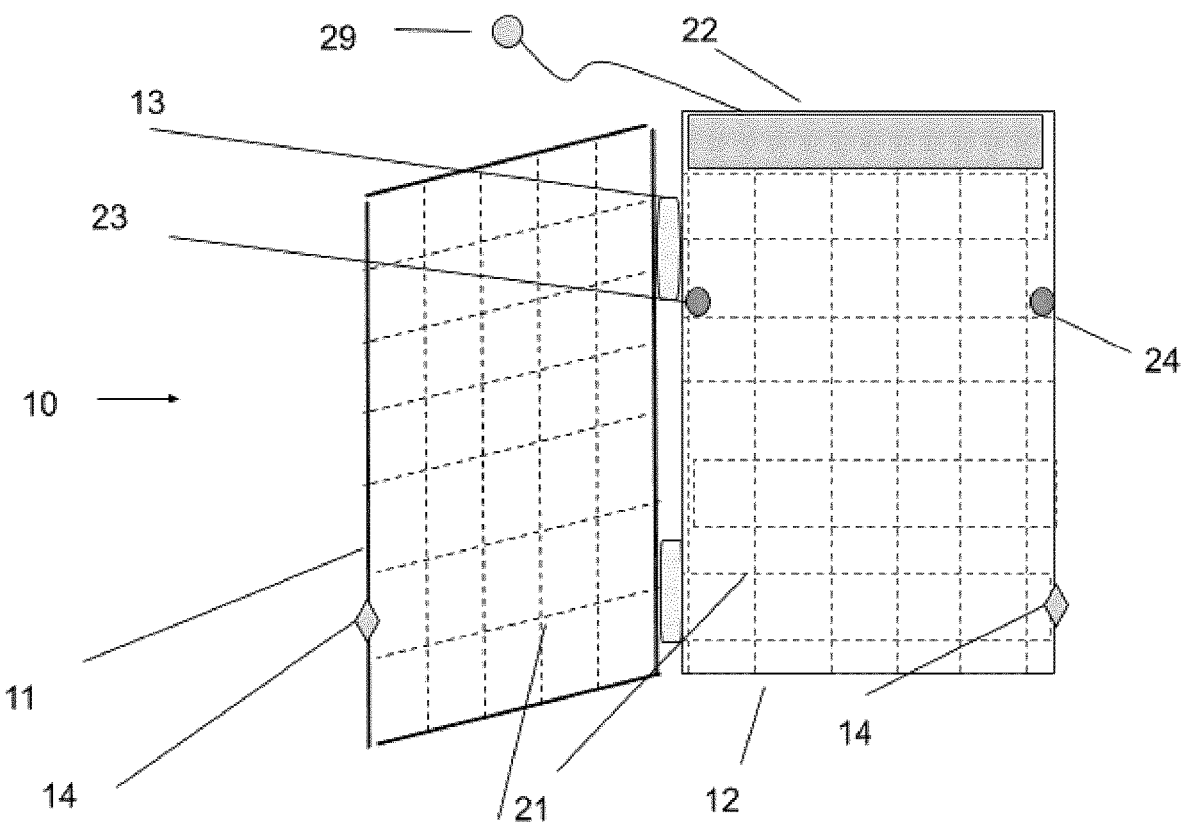
FIG. 1 is a schematic view of a first example of an air filter apparatus, shown in an open position.

Various apparatuses, systems or methods will be described below to provide an example of an embodiment of each claimed invention. No embodiment described below limits any claimed invention and any claimed invention may cover apparatuses, systems and methods that differ from those described below. The claimed inventions are not limited to apparatuses, systems and methods having all of the features of any one apparatus, system or method described below, or to features common to multiple or all of the apparatuses, systems or methods described below. It is possible that an apparatus, system or method described below is not an embodiment of any claimed invention. Any invention disclosed in an apparatus, system or method described below that is not claimed in this document may be the subject matter of another protective instrument, for example, a continuing patent application, and the applicant (s), inventor(s) and/or owner(s) do not intend to abandon, disclaim or dedicate to the public any such invention by its disclosure in this document.

Indoor Air Quality (IAQ) is becoming an increasingly important concern for building occupants, building managers, and HVAC (heating, ventilation and/or air conditioning) professionals. However, cost needs to be factored in as well, for better indoor air quality usually means higher cost. One of the challenges facing HVAC personnel is when to change an air filter as the air filter becomes clogged. As filters trap dust and other airborne particulate matter, they can become clogged. If the air filter is changed too late, it can become too clogged, the filter media can restrict air flow and costs can increase as the fan motor must work harder to maintain an even air flow throughout the building. Also, air quality may be affected. On the other hand, if the air filter is changed too early, there can be the additional cost of the air filter, and also additional unnecessary labor costs. HVAC professionals strive to maintain a consistent and satisfactory indoor air quality while minimizing cost.

There is therefore a need to be able to tell when an air filter is reaching its capacity, and/or predict when an air filter will reach its capacity. There is also a need to communicate air quality information to users in an easily understandable way to make changing air filters easier and less daunting.

There are prior art approaches that attempt to detect when an air filter has become clogged.

Pressure sensors, such as those taught by U.S. Pat. No. 9,101,871, are placed between the points of contact of the frame of an air filter and the housing ductwork. As the filter becomes clogged, the force between the filter frame and the ductwork housing can change. U.S. Pat. No. 3,027,865 senses the air pressure drop across an air filter. These approaches can have a number of disadvantages, e.g., the pressure across an air filter depends on the speed of the fan driving the air; as the fan speed increases, the pressure increases. These types of devices can also be expensive to install, and can give false warnings.

Another approach involves light sensors, such as those taught by U.S. Pat. Nos. 8,231,716 and 8,744,780, in which light is directed at the face of an air filter. U.S. Pat. No. 9,061,229 teaches having a light emitter and a light detector attached to the filter housing so that they are on opposite sides of the filter faces. These approaches can have a number of disadvantages. In some prior art light detection systems, light can traverse across the filter from one face to the opposite face. This technique may only detect the amount of soiling within a relatively small area of the face of the filter. This small area may or may not be representative of the whole filter. Another disadvantage can be that the sensors are attached to duct walls or other ductwork receiving the air filter, and are not built into a removable frame. They can be difficult to install, can require modification of the ductwork system, and, once installed, they may not be easily be taken out and examined. They also can require the assistance of an HVAC expert. In addition, these filters may not allow for differentiation between different types of airborne particulate matter (e.g., dust of different colors, or drywall dust versus smoke particles).

U.S. Pat. No. 4,828,586 teaches a cartridge type electronic air filter. However, it is not a smart filter frame; the filter has no sensors to detect the degree of soiling of the filter, and it has no communication capabilities.

U.S. Pat. Nos. 9,517,429, 9,552,715 and 9,920,947 teach communication capabilities, but with different sensing methods. Furthermore, these patents do not teach data analytics or artificial intelligence services. For example, they do not look at rate of dust accumulation and infer the indoor air quality, and they do not give information about dust type in the home. The information they provide also does not include a timestamp of when the filter was last changed.

The teachings of the present disclosure are directed to a smart air filter apparatus that includes a mechanism for sensing contamination of the filter media. In some examples, the apparatus can include a wave emitter (e.g., an electromagnetic wave emitter and/or sonic wave emitter) that emits a wave which travels through filter media. In some examples, the wave can travel in a direction substantially parallel to outer faces of the filter media, and/or substantially perpendicular to the general direction of air flow. In some examples, portions of the wave can be transmitted through the filter media, portions can be absorbed by the filter media, and other portions can be reflected or scattered by elements of the filter media. In some examples, a wave sensor can be located some distance from the emitter, and sense emissions that originate from the emitter. In some examples, an intensity of the wave received by the sensor can be indicative of the degree of accumulation of dust by the filter media. In some examples, an intensity of the wave received at different wavelengths can be indicative of the quantity and type of dust accumulated. In some examples, a rate of change of wave intensity with respect to time can be indicative of a rate of accumulation of dust, which can be indicative of indoor air quality. The combination of these readings can enable data analytics and/or artificial intelligence systems to make recommendations to the users.

Referring to FIG. 1, an example of an air filter apparatus is shown at reference numeral 10. In the example illustrated, the apparatus 10 is shown in an open position and includes a front frame 11 and a back frame 12. In the example illustrated, the front and back frames 11, 12 are connected by a hinge 13. In the example illustrated, outward rectangular edges of each of the front and back frames 11, 12 are joined by mesh 21 to form a flat surface. As illustrated, at least one of the frames 11, 12 can include a compartment 22 for housing electrical components (e.g., transformer, printed circuit board, microprocessor, controller, and/or memory module).

In the example illustrated, the apparatus 10 includes sensing components in the form of a wave detector 23 that is capable of sensing electromagnetic and/or sonic waves, and a corresponding wave emitter 24. When the frames 11, 12 are moved to a closed position they can engage a latch 14 to form an enclosure for suitable filter media (not shown). In various examples, the latch 14 can include magnetic, mechanical or similar components, or a combination thereof. The apparatus 10 can further include a power source 29, which can be either internal or external.

In some examples, the sensing components can further include a weight sensor (not shown), which can be used to measure the mass of the filter media over time, and thereby determine the degree of accumulation of particulate matter by the filter media over time.

Figure 2:
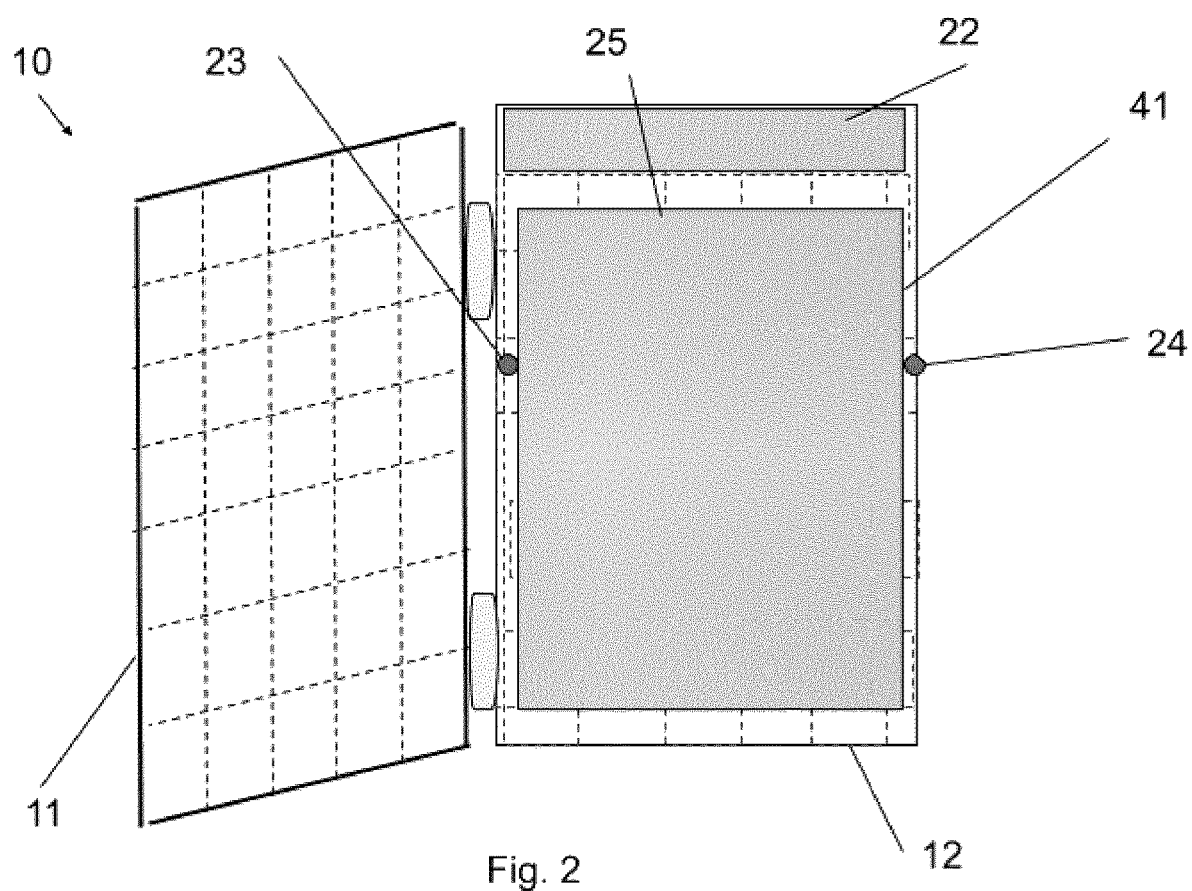
FIG. 2 is a schematic view of the apparatus, shown with a filter media.

Referring to FIG. 2, the apparatus 10 is shown to include a filter media 41 inserted between the frames 11, 12. The apparatus 10 can be designed to accommodate different types of filter media, e.g., high-efficiency particulate air (HEPA) filters, activated carbon filters, standard HVAC filters, electrostatic filter media, and/or active field polarized media.

Figure 3:
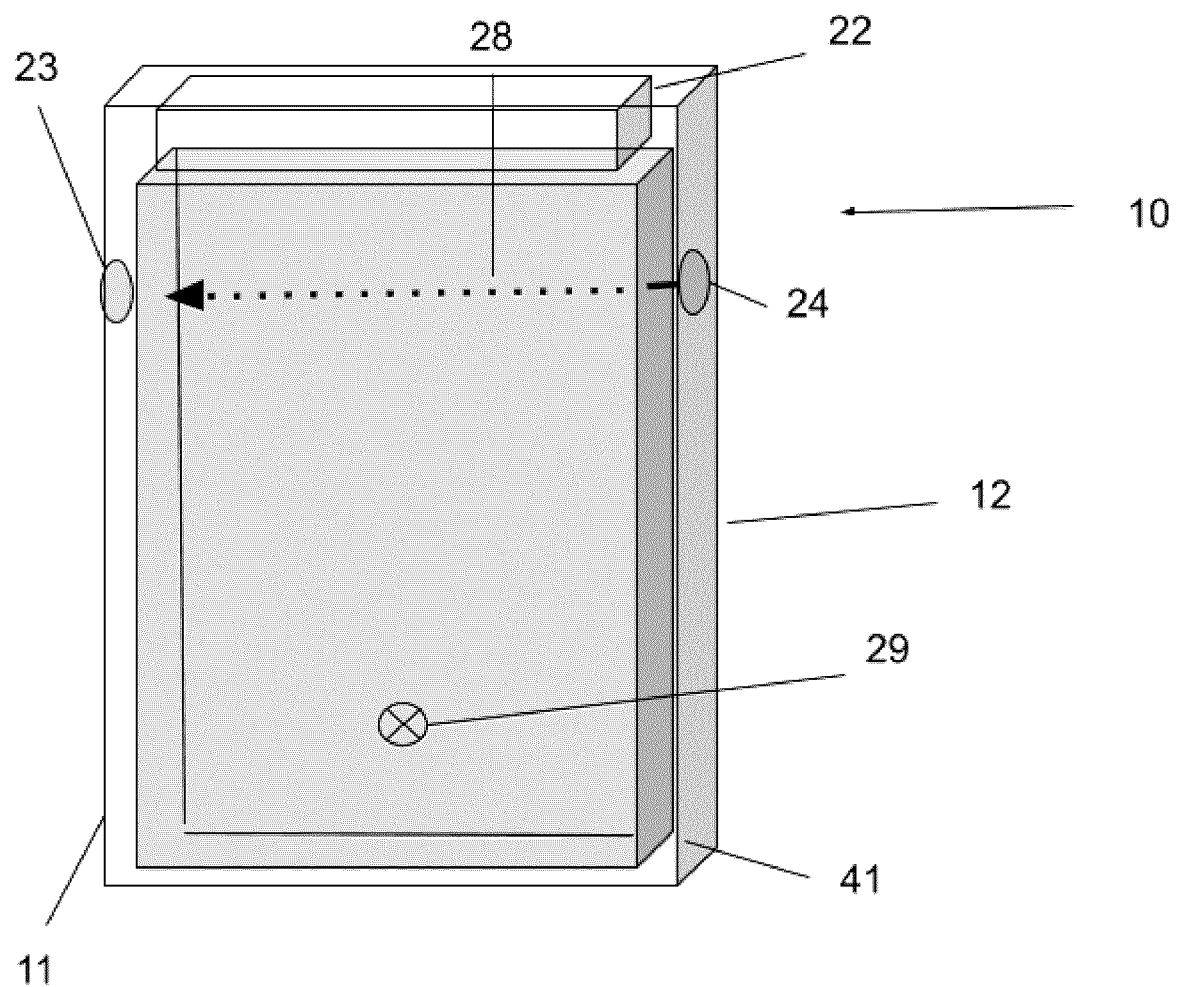
FIG. 3 is a schematic view of the apparatus and the filter media, shown in a closed position.

Referring to FIG. 3, the apparatus 10 is shown in a closed position. In the example illustrated, the wave detector 23 is located at a first edge of the frames 11, 12, and the wave emitter 24 is located spaced apart laterally from the wave detector 23 at a second edge of the frames 11, 12. In the example illustrated, waves from the emitter 24 can travel along a path 28 through and laterally across the filter media 41 towards the detector 23. In the example illustrated, the general wave path is substantially parallel to outer faces of the filter media 41, and substantially perpendicular to the general direction of air flow within the filter media 41.

Figure 4:
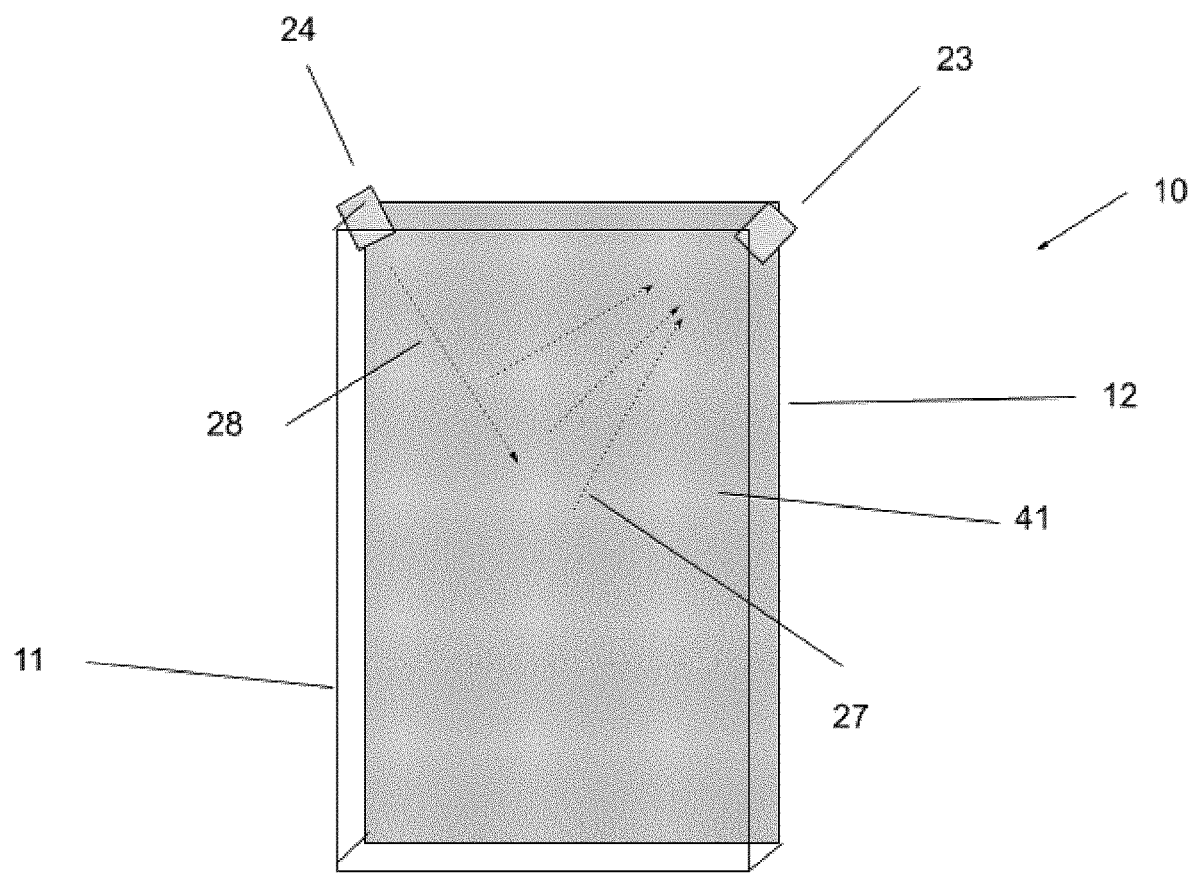
FIG. 4 is a schematic view of a second example of an air filter apparatus.

Referring to FIG. 4, an alternative arrangement is shown in which the wave detector 23 and the wave emitter 24 are located at respective upper corners of the frames 11, 12. In the example illustrated, waves from the emitter 24 can travel along a first path 28 through the filter media 41 at an angle downwardly and laterally, and scattered along the way to travel along a second path 27 through the filter media 41 at an angle upwardly and laterally towards the detector 23.

Figure 4A:
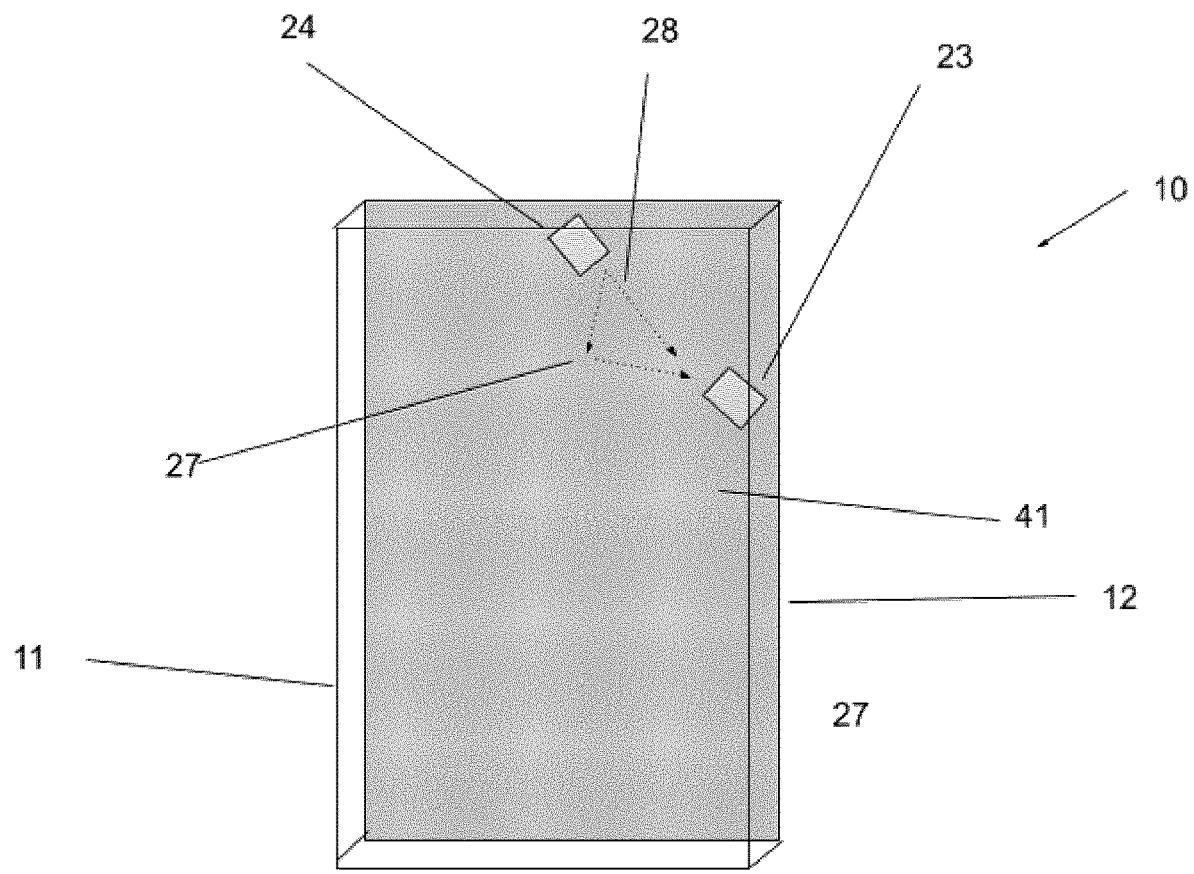
FIG. 4a is a schematic view of a third example of an air filter apparatus.

Referring to FIG. 4a, an alternative arrangement is shown in which the wave detector 23 and the wave emitter 24 are located at adjacent sides. In the example illustrated, waves from the emitter 24 can travel along a first path 28 through the filter media 41 towards detector 23, and can be scattered along the way to travel along a second path 27 through filter media 41 towards the detector 23.

Figure 4B:
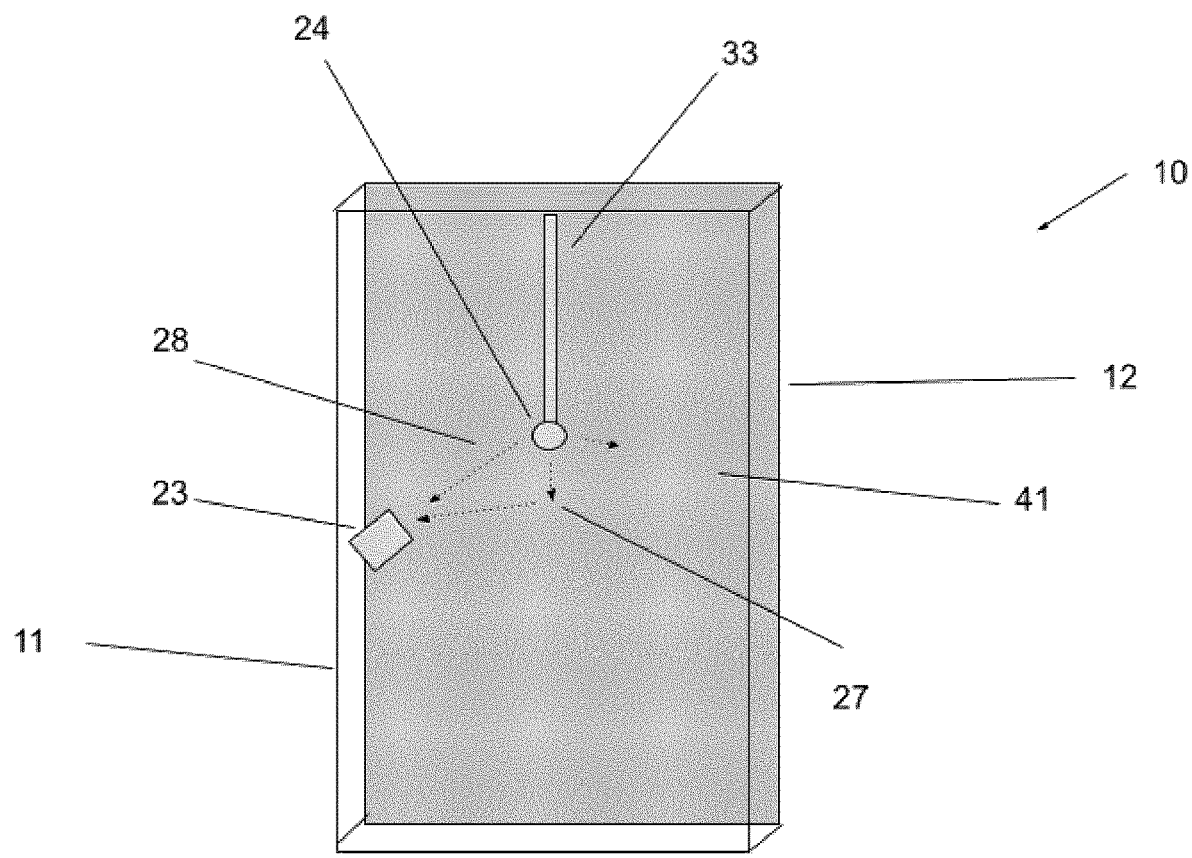
FIG. 4b is a schematic view of a fourth example of an air filter apparatus.

Referring to FIG. 4b, an alternative arrangement is shown in which the wave emitter 24 is located on a conductive strip 33, and connected to a power source. The wave detector 23 is located within the filter media and is spaced apart from the wave emitter. In the example illustrated, waves from the emitter 24 can travel along a first path 28 through the filter media 41 towards detector 23, and can be scattered along the way to travel along a second path 27 through filter media 41 towards the detector 23. It will be appreciated that the positions of wave emitter 24 and wave detector 23 can be interchanged, with the wave emitter located on a conductive strip. In other examples, both the wave emitter and the wave detector can be located on respective conductive strips within the filter media.

In such examples, the wave detector and the wave emitter can be located on adjacent sides, so that waves from the emitter travel along the path through and substantially diagonally across the media. In various examples, the emitter alone, or the detector alone, or both the emitter and detector, can be located anywhere inside the filter, with the emitter and detector spaced apart from each other, so that waves from the emitter travel along the path through the filter media substantially perpendicularly to the general direction of air flow within the filter media.

Figure 5:
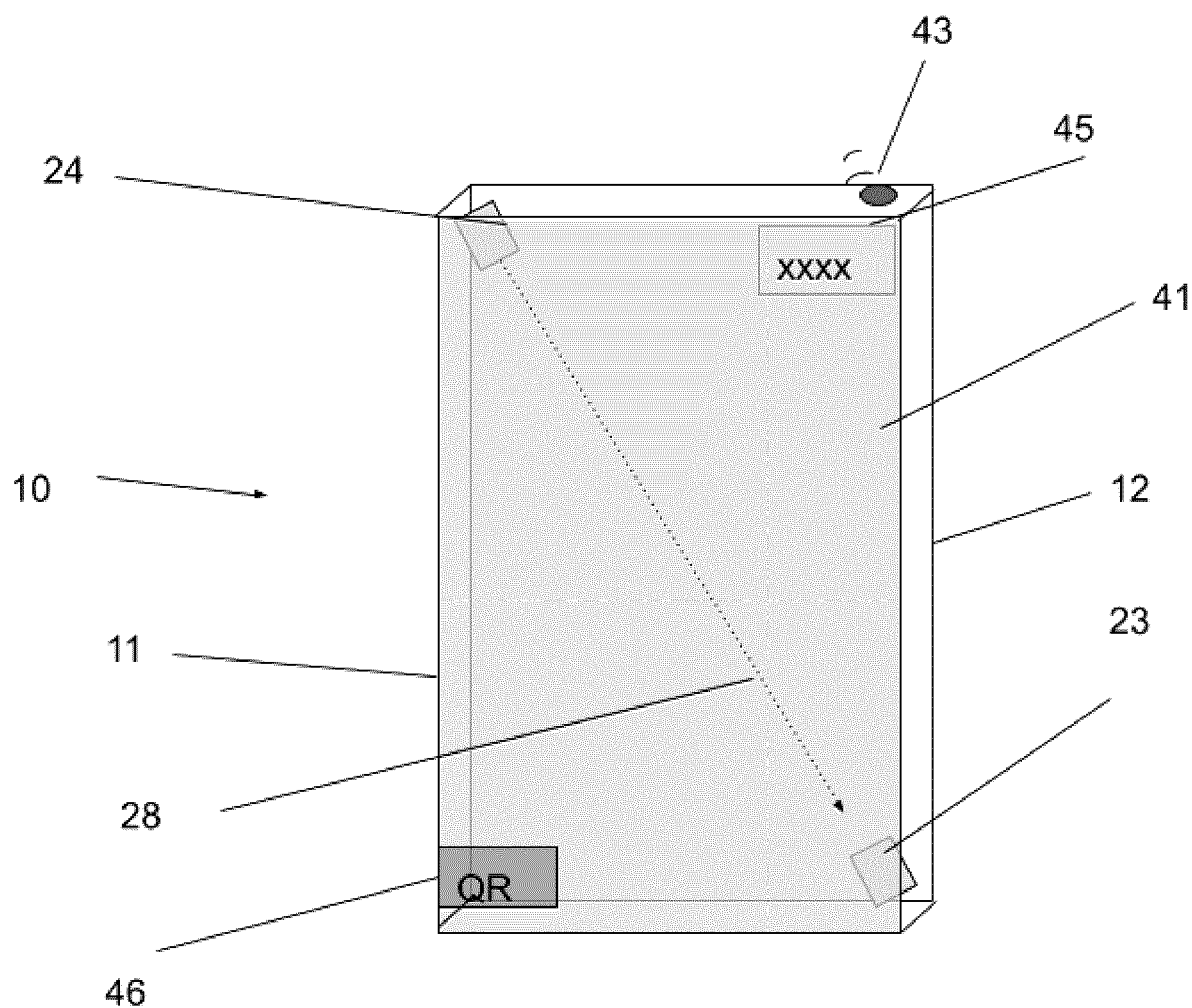
FIG. 5 is a schematic view of a fifth example of an air filter apparatus.

Referring to FIG. 5, an alternative arrangement is shown in which the wave detector 23 and the wave emitter 24 are located at diagonally opposite corners of the frames 11, 12 so that waves can travel along a path 28 through and substantially diagonally across the filter media 41. This can enable soil detection for a relatively large portion of the filter media 41.

In the example illustrated, the apparatus 10 further includes a filter ID marker 45 and a QR code marker 46. In some examples, the filter ID tag 45 can be useful to display a filter identification number. In some examples, the QR code marker 46 can direct users to a website that gives specific information on the filter, such as when the filter was last changed, by whom it was changed, type of dust being trapped, and/or installation videos. Also illustrated is an LED signal 43 that can flash when the filter needs attention, which can be connected to a monitoring system and reflect an online status for the filter media.

Figure 6:
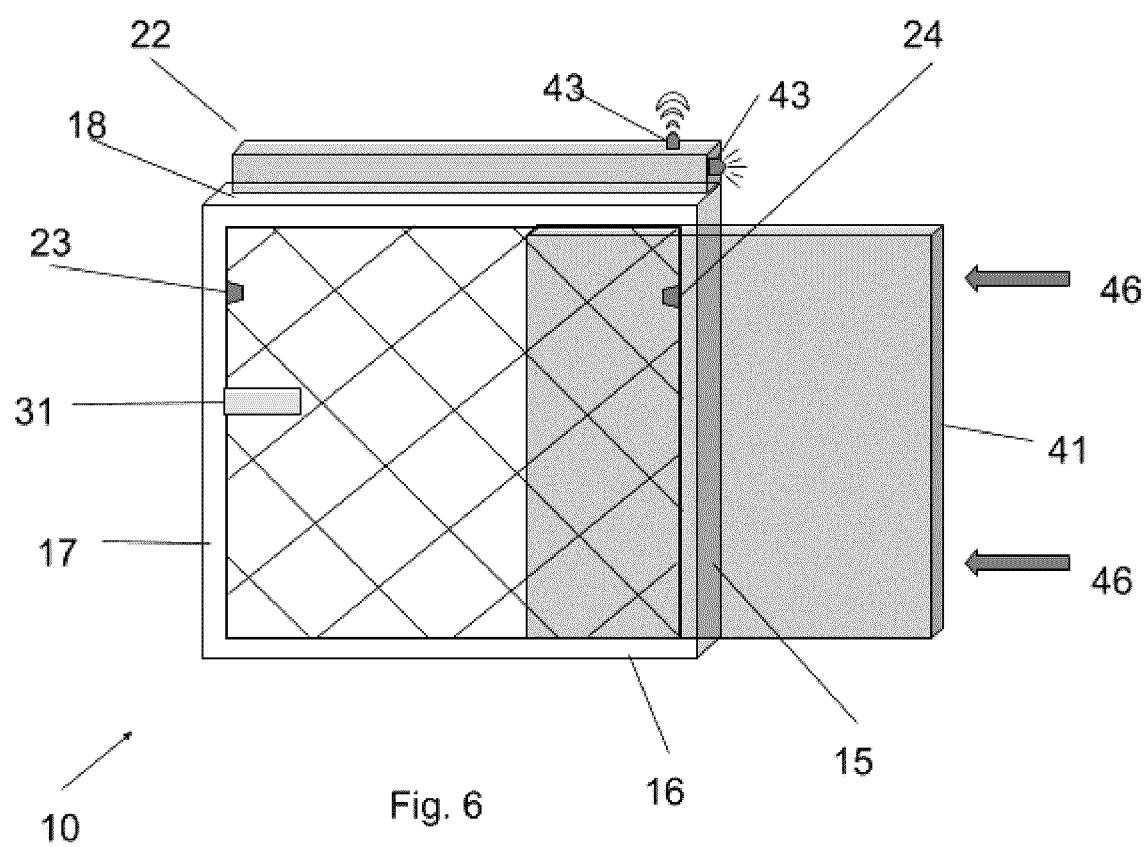
FIG. 6 is a schematic view of a sixth example of an air filter apparatus.

Referring to FIG. 6, an alternative arrangement is shown in which the apparatus 10 includes four frame edges 15, 16, 17, 18. In the example illustrated, the frame edge 15 can be made to accommodate the filter media 41 to be inserted into the apparatus 10 by sliding in a direction 46. In some examples, the filter media 41 can be a rigid filter media, and/or can have its own rigid frame allowing it to be slidably inserted into the apparatus 10. It can be appreciated that one or more of the frame edges 15, 16, 17, 18 can be open, including the edge 18, where the compartment 22 is located. In the example illustrated, the wave detector 23 is located at the frame edge 17 and the wave emitter 24 is located spaced apart laterally from the wave detector 23 at the edge 15. In the example illustrated, the wave detector 23 and the wave emitter 24 can detect a degree of contamination of the filter media 41, and a strain gauge sensor 31 can detect resistance of the filter media 41 to air flow.

Figure 7:
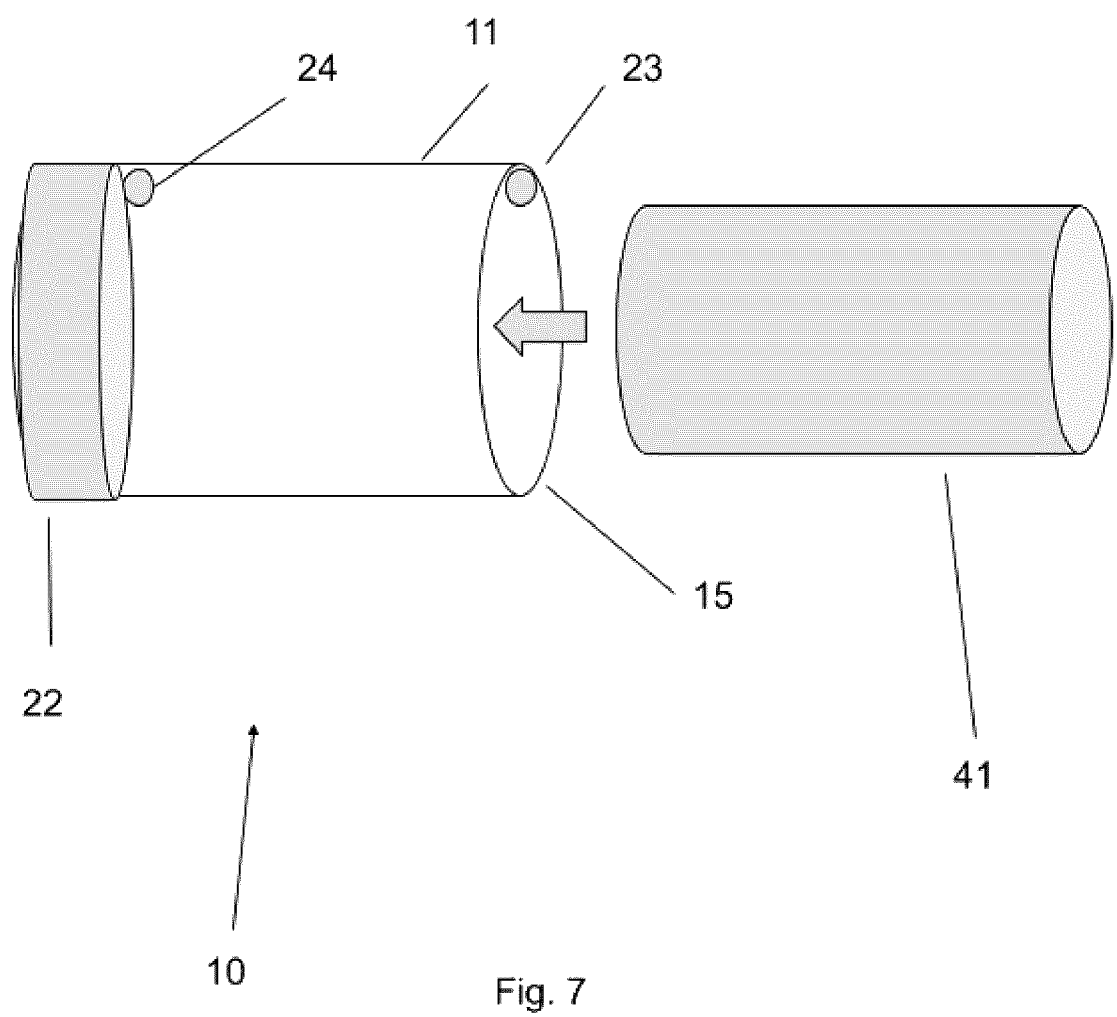
FIG. 7 is a schematic view of a seventh example of an air filter apparatus.

Referring to FIG. 7, an alternative arrangement is shown in which the apparatus 10 includes a frame 11 that is cylindrical in shape and accommodates the filter media 41. In the example illustrated, the filter media 41 is of a complementary shape and can slidably inserted into a first open end 15 to be positioned concentrically within the frame 11. The end 15 can be constructed to accommodate the insertion of filter media 41. The compartment 22 can be sized and shaped to be housed within a second end of the frame 11 opposite from the end 15. In the example illustrated, the wave detector 23 is located adjacent to the end 15 and the wave emitter 24 is located spaced apart axially from the wave detector 23 adjacent to the compartment 22 at the second end. In the example illustrated, waves from the emitter 24 can travel through and axially across the filter media 41 towards the detector 23.

Figure 8:
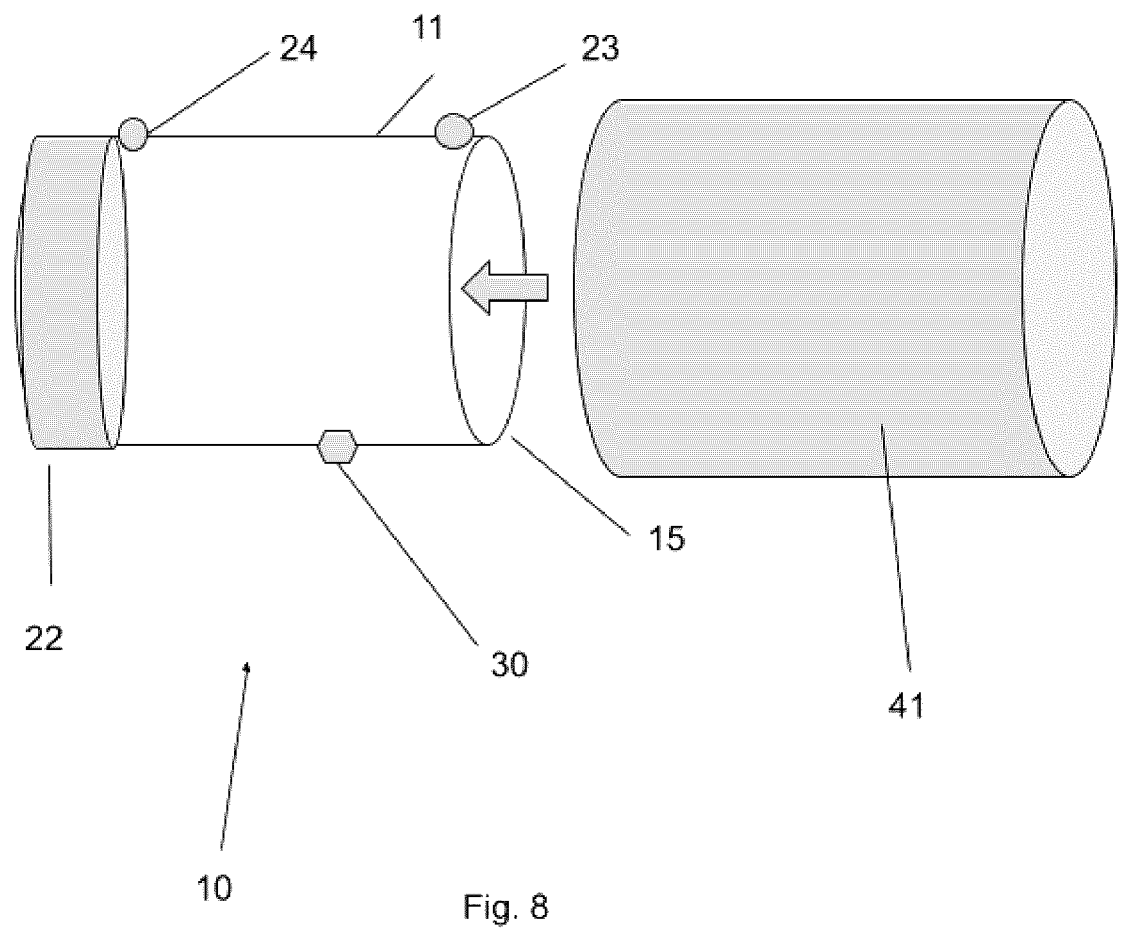
FIG. 8 is a schematic view of an eighth example of an air filter apparatus.

Referring to FIG. 8, an alternative arrangement is shown in which the filter media 41 is cylindrical and has a larger diameter than the frame 11 of the apparatus 10 so that the filter media 41 encloses the frame 11. The frame 11 can be perforated or otherwise porous to permit air flow therethrough. In the example illustrated, waves from the emitter 24 can travel through and axially across the filter media 41 towards the detector 23. Additionally, a sensor 30 can be used to detect contaminants in the air stream, e.g., volatile organic compounds (VOCs), carbon monoxide, radon gas, and/or particulates.

Referring to FIGS. 9a, 9b and 9c, an alternative arrangement is shown in which the apparatus 10 includes a frame 11 that is cylindrical in shape and accommodates the filter media 41. In the example illustrated, the wave detector 23 is adjacent to a first end of the frame and the wave emitter 24 is located spaced apart axially from the wave detector 23 adjacent to the compartment 22, with the wave detector 23 and the wave emitter 24 located at radially opposite sides of the frame 11. In the example illustrated, waves from the emitter 24 can travel through and axially and radially across the filter media 41 towards the detector 23. FIG. 9b shows the filter media 41 housed within the frame 11. FIG. 9c shows the filter media 41 being slidably inserted into the frame 11.

Figure 10:
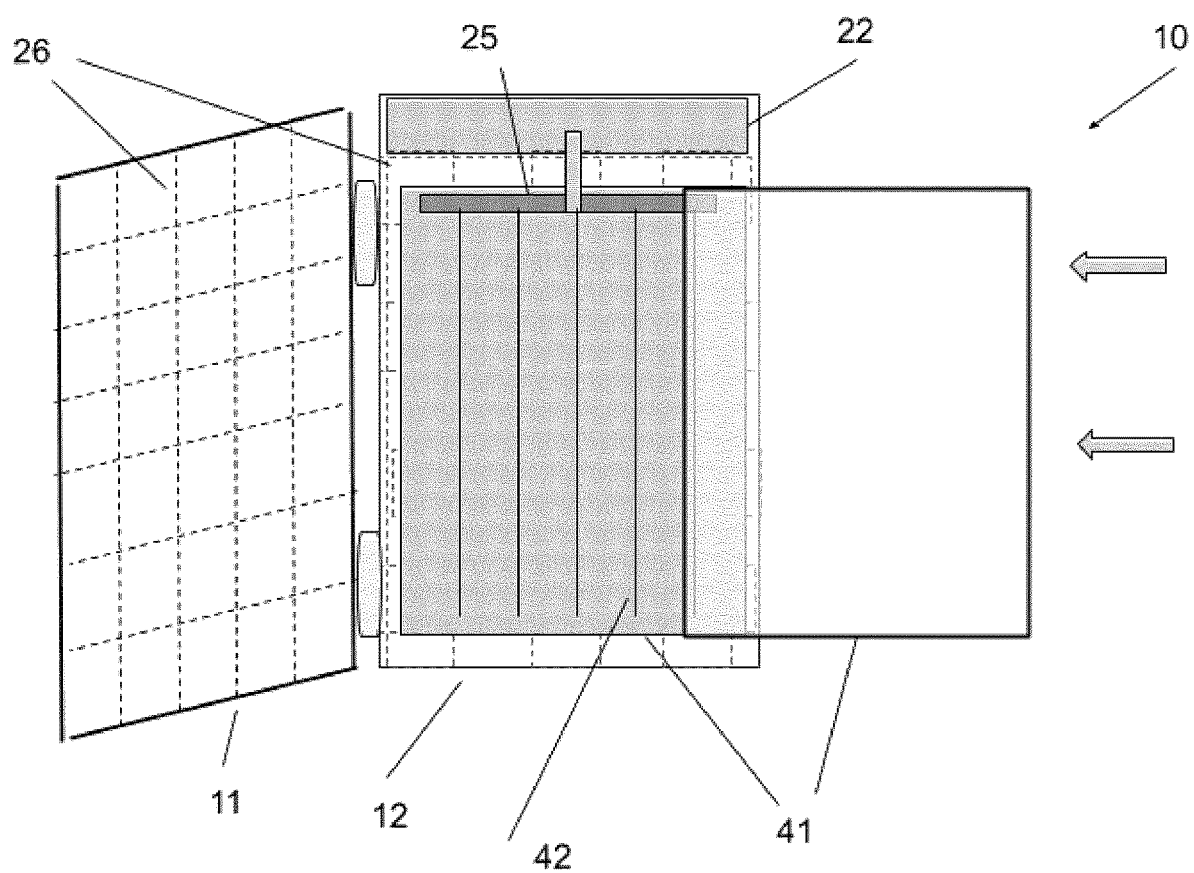
FIG. 10 is a schematic view of a tenth example of an air filter apparatus.

Referring to FIG. 10, an alternative arrangement is shown in which electrical properties can be used to sense the condition of the apparatus 10 and the filter media 41. In the example illustrated, the apparatus 10 is shown in an open position and includes a front frame 11 and a back frame 12. In the example illustrated, outward rectangular edges of each of the front and back frames 11, 12 can surround a conductive mesh or porous material. As illustrated, the back frame 12 can include the compartment 22 for housing electrical components (e.g., internal power supply, transformer, microprocessor, memory module, communication module, voltmeter, ammeter, capacitance measurement instrument, resistance measurement instrument, and/or wave generator). The apparatus 10 can further include a power source to the electrical compartment 22, which can be either internal or external.

In the example illustrated, the apparatus 10 includes a positive terminal 25 and a plurality of conductive elements in the form of strips 42. In the example illustrated, the positive terminal 25 extends laterally and includes a connection to the electrical compartment 22. In the example illustrated, the conductive strips 42 are connected laterally along the positive terminal 25, and extend longitudinally away from the positive terminal 25. A first pad of the filter media 41 can be placed under the positive terminal 25 and the conductive strips 42, and another pad of the filter media 41 can be placed over the positive terminal 25 and the conductive strips 42. When the apparatus 10 is moved to a closed position, the order of the layers from front to back can be: the front frame 11, which can be connected to a ground terminal; the first pad of the filter media 41; the positive terminal 25 and the conductive strips 42; the second pad of the filter media 41; and the back frame 12, which can be connected to a ground terminal.

Figure 11:
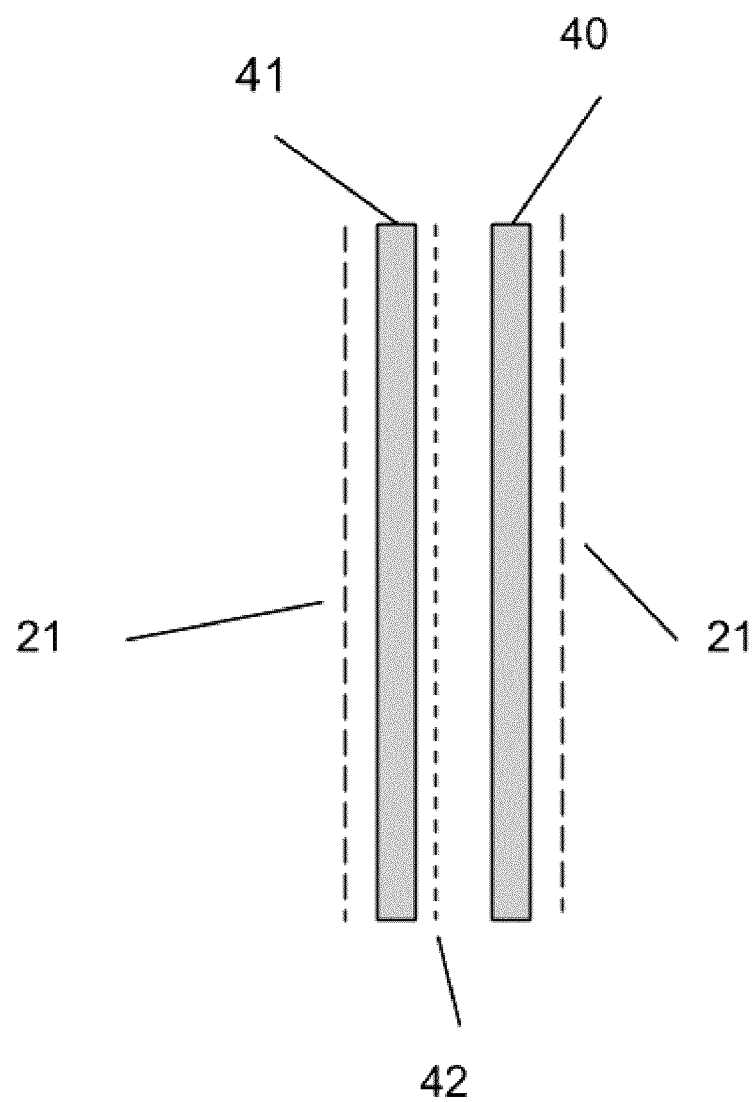
FIG. 11 is a schematic view of an arrangement between electrical terminals and a filter media.

Referring to FIG. 11, the conductive strips 42 are shown sandwiched between the two pads of the filter media 41. Both pads of the filter media 41 are sandwiched between ground terminals 21.

In some examples, the positive terminal 25, the conductive strips 42, and the electrical components housed in the compartment 22 can be used to measure at least one of the following electrical properties relating to the apparatus 10 and the filter media 41: electrical current; electrical voltage; electrical resistance; electrical capacitance; and electrical waveform. In some examples, the condition of the apparatus 10 and/or the filter media 41 can be determined by measuring at least one of these electrical properties.

Figure 12:
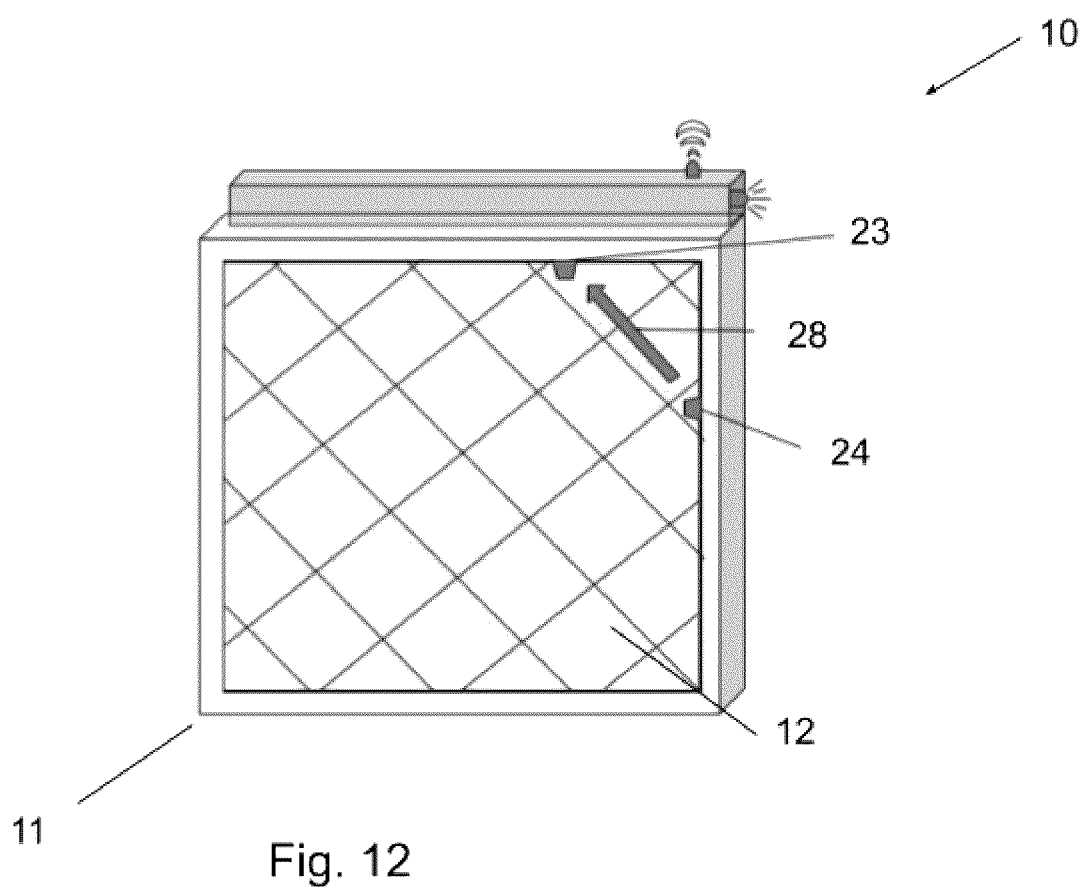
FIG. 12 is a schematic view of an eleventh example of an air filter apparatus.

Referring to FIG. 12, an alternative arrangement is shown in which the wave detector 23 and the wave emitter 24 are located adjacent to the same corner of the frames 11, 12. The wave emitter 24 can be an LED light. In the example illustrated, waves from the emitter 24 can travel along a diagonal path 28 through the filter media 41 towards the detector 23

Figure 13:
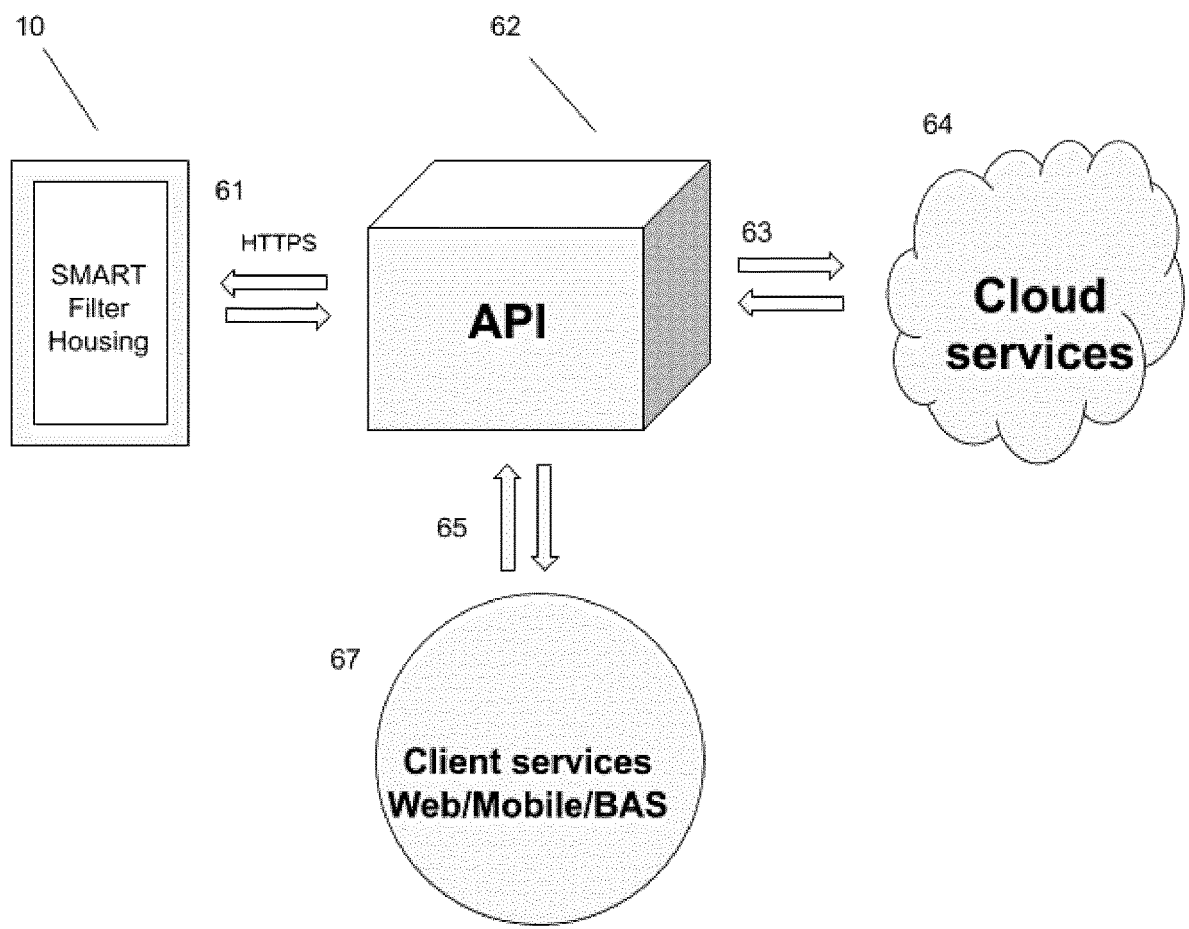
FIG. 13 is a schematic view of a system.

FIG. 13 illustrates a communications system including the apparatus 10. In the example illustrated, the apparatus 10 is connected via a wired or wireless network to an Application Programming Interface (API) 62 located on a remote server via a communication process 61. In some examples, information sent between the apparatus 10 and the API 62 using process 61 can include the following:
wave measurements received by a detector (e.g., the wave detector 23);
electrical measurements received by electrical components (e.g., the positive terminal 25, the conductive strips 42, and the electrical components housed in the compartment 22);
a filter identification code;
a filter location;
a filter status;
a timestamp;
environmental data;
a user ID; and/or
filter control codes, e.g., filter reset, filter change notification.

In the example illustrated, the API 62 can also communicate with cloud services 64 via a communication process 63. In some examples, the cloud services 64 can include database services, artificial intelligence, machine learning, and/or data analytical services (e.g., Google Cloud Platform™, DigitalOcean™, and Amazon Web Services™). In some examples, communication between the API 62 and the cloud services 64 using process 63 can include the following:
some or all data exchanged between the apparatus 10 and the API 62, via from process 61;
type of particulate matter;
soil level;
fill level of the filter media;
rate of particulate matter accumulation on the filter media;
estimate of building air quality; and/or
change history of the filter media.

In the example illustrated, the API 62 can further communicate with client services 67 via a communication process 61. In some examples, the client services 67 can include mobile applications, computer applications, web applications, and/or building automation systems. In some examples, communication between the API 62 and the client services 67 using process 65 can include the following:
some or all data exchanged between the apparatus 10, the API 62 and the cloud services 64, via process 61 and/or process 63;
filter media ordering information; and/or
user interface and presentation information.

FIG. 14 illustrates a user interface. In some examples, the user interface can provide building maintenance staff with an overview of the performance of filters currently in operation. Individual filters can be attached to a corresponding Filter ID 70, a building location 71 for each individual filter, a date 72 the filter has been changed, and a User ID 73 for the technician who installed the filter.

Figure 15:
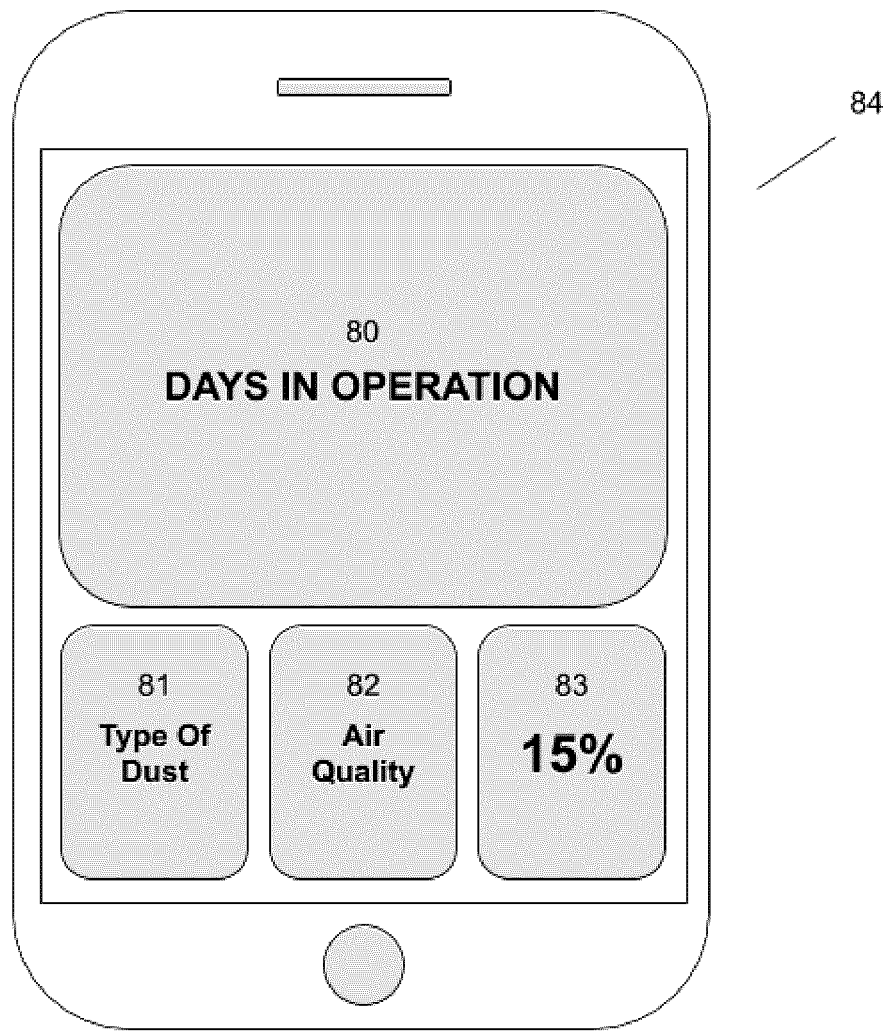
FIG. 15 illustrates another example of a user interface on a client application.

FIG. 15 illustrates another user interface. In some examples, the user interface can provide information in order to monitor individual filter performance. The user can be provided with filter data, including days in operation 80, type of dust that has been filtered 81, a predicted air quality reading 82, and a remaining filter life displayed in a percentage 83.

In accordance with the foregoing, it will be appreciated that the present disclosure is directed to a smart air filter apparatus, into which an air filter media can be inserted. The apparatus can have sensing capabilities that detect the condition of the filter media, and communication capabilities that involve sending and receiving information. In some examples, the apparatus can have electronic communicating and sensing components. In some examples, the apparatus can sends and receive information to or from an external agent (e.g., a remote server). In some examples, the remote server can analyze the information and communicate with a user. In some examples, communication with a user can include filter status, general HVAC status, environmental information, and general judgmental and prediction information relating to air quality. In some particular examples, the server can communicate the rate of dust accumulation of the filter, the type of dust accumulated, the timestamp of when the filter media was last changed, and by whom, the filter ID, filter location, and the general indoor air quality.

In some examples, the smart air filter apparatus can implemented as a "retrofit", to fit into ductwork slots intended for typical air filters. Furthermore, the apparatus can be designed to accommodate different types of filter media, e.g., HEPA filters, activated carbon filters, and/or standard HVAC filter media.

Moreover, it will be appreciated that the sensing capabilities can be used to detect the clog status of a large representative area of the filter media, and/or the clog status of the depth of the filter media, not just the surface of the media. The sensing capabilities can be further used to detect the type of dust collected by the filter media, and/or detect contaminants, e.g., VOCs, carbon monoxide, radon gas, and/or particulates.

Additionally, the smart air filter apparatus can make filter installation and filter media changes more user friendly. The smart air filter apparatus can facilitate communication with a user to exchange information, such as filter status information, reset of filter information, filter identification, filter location, particulate matter characteristics, and indoor air quality. Data analytics and machine learning can also be used to predict future filter performance, HVAC system performance, and overall indoor air quality.

While the above description provides examples of one or more apparatuses, systems and/or methods, it will be appreciated that other apparatuses, systems and/or methods may be within the scope of the accompanying claims.

We claim:

1. An air filter apparatus, comprising:
   a filter media;
   at least one frame that is configured to receive the filter media;
   at least one sensing mechanism for sensing contamination of the filter media; and
   a power source,
   wherein the at least one sensing mechanism comprises a wave emitter configured to emit a wave and a wave detector configured to detect the wave,
   wherein the at least one frame comprises a front frame and a back frame that is coupled to the front frame, and the front and back frames are movable between open and closed positions, and, in use in the closed position, the filter media is arranged between the front and back frames,
   wherein the wave emitter and the wave detector are arranged so that the wave travels through the filter media along a path that is substantially parallel to outer faces of the filter media,
   wherein the path is substantially perpendicular to the general direction of air flow within the filter media,
   wherein the filter media comprises an active field polarized media, and
   wherein the power source is configured to power the wave emitter, the wave detector and the active field polarized media.

2. The apparatus of claim 1, wherein the wave emitter comprises at least one of an electromagnetic wave emitter and a sonic wave emitter.

3. The apparatus of claim 1, wherein the at least one frame comprises a plurality of frame edges, and at least one of the frame edges is open to permit the filter media to be slidably inserted into the apparatus.

4. The apparatus of claim 1, wherein the wave detector is located at a first edge of the at least one frame, and the wave emitter is located spaced apart laterally from the wave detector at a second edge of the at least one frame, so that waves from the emitter travel along the path through and laterally across the filter media towards the detector.

5. The apparatus of claim 1, wherein the wave detector and the wave emitter are located at respective upper corners of the at least one frame, so that waves from the emitter travel along a first path through the filter media at an angle downwardly and laterally, and scattered along the way to travel along a second path through the filter media at an angle upwardly and laterally towards the detector.

6. The apparatus of claim 1, wherein the wave detector and the wave emitter are located on adjacent sides of the at least one frame, so that waves from the emitter travel along a first path through and substantially diagonally across the filter media towards the detector.

7. The apparatus of claim 1, wherein at least one of the wave detector and the wave emitter is located on a conductive strip and the other is spaced apart and located within the filter media, so that waves from the emitter travel along a first path through and across the filter media towards the detector.

8. The apparatus of claim 1, wherein the wave detector and the wave emitter are located at diagonally opposite corners of the at least one frame, so that waves from the emitter travel along the path through and substantially diagonally across the filter media.

9. The apparatus of claim 1, wherein the wave detector and the wave emitter are located at adjacent to a same corner of the at least one frame, so that waves from the emitter travel along the path through and substantially diagonally across the filter media.

10. The apparatus of claim 1, comprising a plurality of conductive elements that are configured to be positioned within the filter media to measure at least one electrical property of the filter media.

11. The apparatus of claim 1, comprising a compartment that houses at least one electrical component, wherein the at least one electrical component is selected from a transformer, a printed circuit board, a microprocessor, a controller, a memory module, an internal power supply, a communication module, a voltmeter, an ammeter, a capacitance measurement instrument, a resistance measurement instrument, and a wave generator.

12. The apparatus of claim 1, comprising at least one of an internal power source and an external power source.

13. The apparatus of claim 1, comprising at least one sensor configured to detect contaminants in air flowing through the filter media, wherein the contaminants are selected from at least one of volatile organic compounds, carbon monoxide, radon gas, and particulates.

14. The apparatus of claim 1, comprising a strain gauge sensor configured to detect resistance of the filter media to air flow.

15. The apparatus of claim 1, comprising at least one of a filter ID marker and a QR code marker.

16. The apparatus of claim 1, wherein the at least one sensing mechanism comprises a weight sensor configured to measure a mass of the filter media over time.

17. The apparatus of claim 1, wherein the power source comprises an internal power source for powering the filter media.

18. The apparatus of claim 1, wherein the power source comprises an external power source for powering the filter media.

19. An air filter apparatus, comprising:
- at least one frame that is configured to receive a filter media; and
- at least one sensing mechanism for sensing contamination of the filter media,
- wherein the at least one sensing mechanism comprises a wave emitter configured to emit a wave and a wave detector configured to detect the wave,
- wherein the at least one frame comprises a front frame and a back frame that is coupled to the front frame, and the front and back frames are movable between open and closed positions, and, in use in the closed position, the filter media is arranged between the front and back frames,
- wherein the wave emitter and the wave detector are arranged so that the wave travels along a path that is substantially parallel to outer faces of the filter media, and
- wherein at least one of the wave detector and the wave emitter is located on a conductive strip and the other is spaced apart and located within the filter media, so that waves from the emitter travel along a first path through and across the filter media towards the detector.

* * * * *